(12) United States Patent
Riviere et al.

(10) Patent No.: US 9,546,893 B2
(45) Date of Patent: Jan. 17, 2017

(54) DEVICE FOR MEASURING LIQUID LEVEL

(75) Inventors: Ludovic Riviere, Douvres la Delivrande (FR); Dominique Le Bouquin, Herouville Saint Clair (FR); Franck Menard, Saint Germain le Vasson (FR); Nicolas Renard, Essex (FR); Xavier Michaudet, Caen (FR)

(73) Assignee: SC2N, Creteil (FR)

( * ) Notice: Subject to any disclaimer, the term of this patent is extended or adjusted under 35 U.S.C. 154(b) by 175 days.

(21) Appl. No.: 14/235,357

(22) PCT Filed: Jul. 26, 2012

(86) PCT No.: PCT/FR2012/051769
§ 371 (c)(1),
(2), (4) Date: Jun. 18, 2014

(87) PCT Pub. No.: WO2013/014394
PCT Pub. Date: Jan. 31, 2013

(65) Prior Publication Data
US 2014/0290356 A1 Oct. 2, 2014

(30) Foreign Application Priority Data

Jul. 28, 2011 (FR) ..................... 11 56882

(51) Int. Cl.
*G01F 23/00* (2006.01)
*G01F 23/24* (2006.01)
*B60K 15/03* (2006.01)

(52) U.S. Cl.
CPC ......... *G01F 23/0023* (2013.01); *G01F 23/242* (2013.01); *G01F 23/246* (2013.01);
(Continued)

(58) Field of Classification Search
None
See application file for complete search history.

(56) References Cited

U.S. PATENT DOCUMENTS 3,678,750 A * 7/1972 DiNoia ................... G01F 23/72
200/84 C
4,641,523 A * 2/1987 Andreasson ............ G01F 23/68
338/33

(Continued)

FOREIGN PATENT DOCUMENTS

| FR | 2 901 877 A1 | 12/2007 |
| WO | 2010/046554 A1 | 4/2010 |
| WO | 2010/068445 A2 | 6/2010 |

OTHER PUBLICATIONS

International Search Report for corresponding International Application No. PCT/FR2012/051769, mailed Nov. 9, 2012 (4 pages).

*Primary Examiner* — Andre Allen
(74) *Attorney, Agent, or Firm* — Osha Liang LLP

(57) ABSTRACT

Device (1) for measuring a liquid level, comprising: —a body (2) extending along a longitudinal axis (X) and having at least one open portion (5) in which at least one aperture (A) is formed in the wall of the body (2), —a loop (10) of electric wire positioned at least in the open portion (5) so that it can be in contact with the liquid and run substantially parallel to the longitudinal axis (X) of the body (2), —an electric power supply circuit (15, 16) for powering the loop of wire arranged in the body, the circuit comprising two end fittings (16) positioned in the open portion (5), each end fitting (16) being connected to one of the open ends (11) of the loop (10), the end fittings (16) being arranged in an offset manner along the longitudinal axis (X) of the body (2).

12 Claims, 1 Drawing Sheet

(52) U.S. Cl.
CPC ............... *B60K 2015/03217* (2013.01); *Y10T 29/49117* (2015.01)

(56) References Cited

U.S. PATENT DOCUMENTS

| | | | | |
|---|---|---|---|---|
| 4,671,121 A | * | 6/1987 | Schieler | G01F 23/36 340/625 |
| 5,129,261 A | * | 7/1992 | Riley | G01F 23/68 338/33 |
| 5,210,769 A | | 5/1993 | Seidel et al. | |
| 2008/0134776 A1 | * | 6/2008 | Zhou | G01F 23/18 73/291 |
| 2008/0148844 A1 | * | 6/2008 | Haberstroh | F17C 13/021 73/295 |
| 2012/0017675 A1 | * | 1/2012 | Phillips | G01F 23/242 73/292 |
| 2012/0240675 A1 | * | 9/2012 | Farmanyan | G01F 23/268 73/304 C |

\* cited by examiner

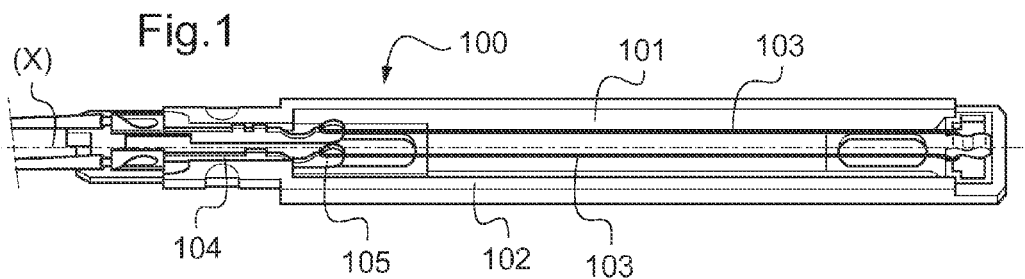
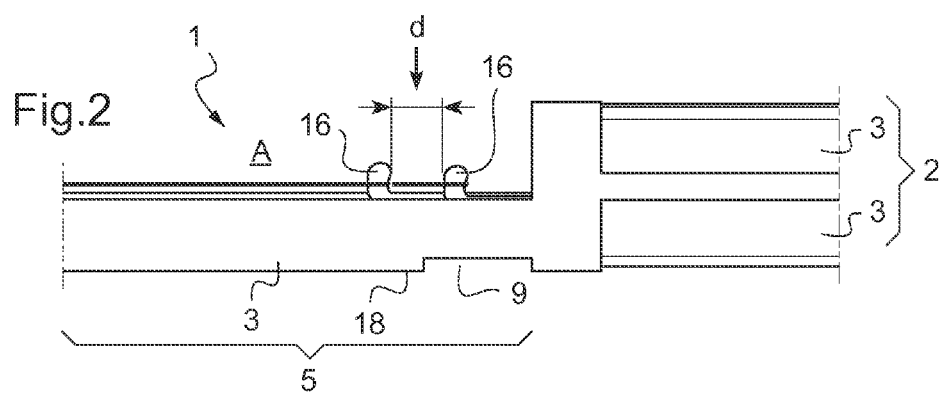
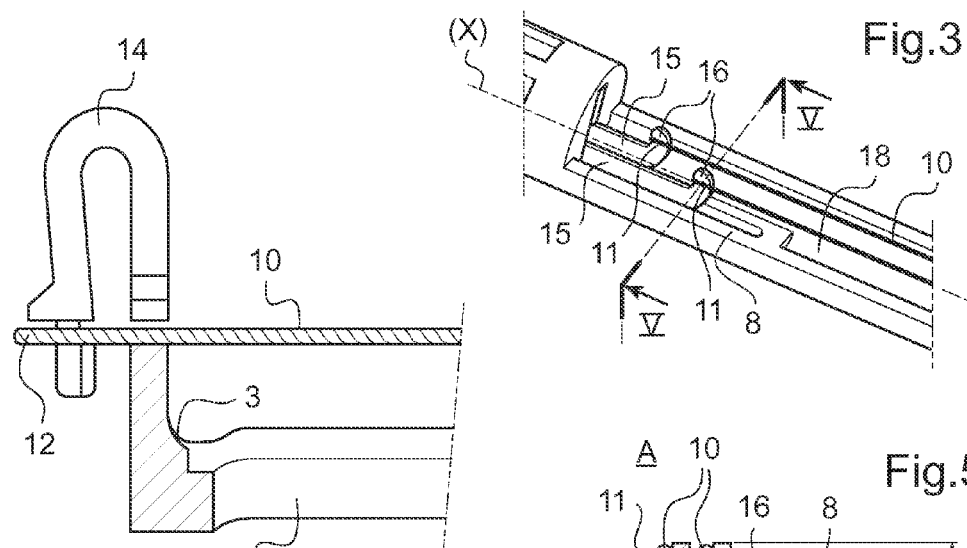
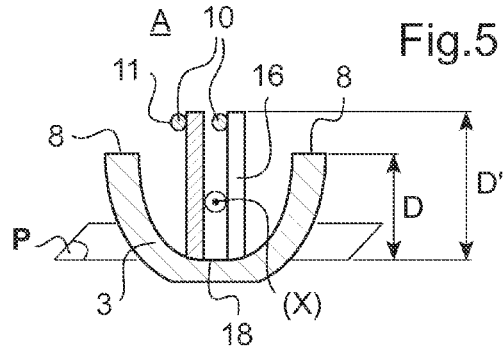

DEVICE FOR MEASURING LIQUID LEVEL

The present invention concerns a device for measuring a liquid level and in particular for detection of the level of a liquid in an automobile vehicle. The invention applies for example to measuring the oil level in the crankcase or the gearbox or the level of the cooling liquid of the cooling circuit or the air-conditioning circuit or the level of the petrol or diesel tank. The invention may further be applied to detecting the level of a urea tank in an automobile vehicle or in a heavy goods vehicle.

Monitoring the liquid level is a constant concern in the automotive field because it enables the provision of information on the correct functioning of the vehicle.

Devices for measuring liquid level in an automobile vehicle are known. One example of a known device 100 is represented in FIG. 1. The device 100 is for measuring the liquid level in a tank. This device 100 includes a body 101 that is produced in two parts 102 of which only one is represented in FIG. 1. A loop 103 of electrical wire is disposed in the body 101, this wire loop 103 being supplied with electrical power by a power supply circuit including for example tracks 104 each connected by an end fitting 105 to an open end of the loop 103. These tracks may be connected to an electrical power supply, for example a power supply delivering a direct current during a finite time interval for each level measurement.

The wire loop 103 forms a resistive probe which, when mounted on the vehicle, is partially immersed in the liquid to be monitored. The electrical wire of the loop 103 is heated when a current passes through it.

In a known manner, examining the voltage measured between the two open ends of the loop 103 enables the liquid level in the tank to be determined, as explained in the preamble of application EP 2 350 579 in the name of the Applicant. The device 100 represented in FIG. 1 is manufactured by first connecting an end fitting 105 to an open end of the loop 103 and then, once each open end of the loop is connected to an end fitting 105, mounting the assembly formed by the loop 103 and its power supply circuit in the body 100. This procedure has a number of drawbacks since it is costly in terms of time and the electrical wire of the loop 103 may be damaged or stretched when it is mounted in the body 100, after connection of the loop to the end fittings.

There exists a requirement to remedy the aforementioned drawbacks.

An object of the invention is to address some or all of this requirement and one of its aspects achieves this by means of a device for measuring a liquid level including:
- a body running along a longitudinal axis and having at least one open portion in which at least one aperture is provided in the wall of the body,
- a loop of electrical wire disposed at least in the open portion so as to be able to be in contact with the liquid and to run substantially parallel to the longitudinal axis of the body, and
- an electrical power supply circuit of the wire loop disposed in the body, the circuit including two end fittings disposed in the open portion, each end fitting being connected to one open end of said loop, the end fittings being disposed in an offset manner along the longitudinal axis of the body.

Because of the offset disposition of the end fittings along the longitudinal axis of the body, a space is provided in the vicinity of each end fitting and an automated head can be disposed in this space to connect the end fitting and one end of the loop. The connection employs soldering and wire-wrapping, for example, and the automated head is a soldering and wire-wrapping head.

In the context of the invention, the longitudinal axis of the body is the axis along which the body has the greatest dimension.

Also in the context of the invention, the open portion is an apertured portion and the open ends of the loop are the ends of the loop.

The operation of connecting the wire loop to its power supply circuit can therefore be effected when the wire loop and the power supply circuit are already in place in the body. The risks of damaging or stretching the electrical wire during subsequent fitting in the body are therefore eliminated.

The aperture may be such that at the level of each end fitting the distance measured perpendicularly to the longitudinal axis of the body between the plane tangential to the bottom of the body and the edge of the aperture is less than the distance measured perpendicularly to said longitudinal axis between the plane tangential to the bottom of the body and the electrical wire. The wall of the body can thus be lowered, which makes it possible to reduce the risks of interference between the automated head and the body during the connection operation because this lowering of the wall facilitates the passage of the head.

The expression "bottom of the body" designates the part of the wall of the body at the level of its open portion that is at the greatest distance from the aperture when the body is observed perpendicularly to its longitudinal axis.

The power supply circuit may include metal tracks and the end fitting may form an end of each track.

The power supply circuit is connected to an electrical power supply which may be integrated into the device or not.

The end fitting may have a curved shape. The end fitting is molded onto the interior of the wall of the body, for example.

The body may have a substantially cylindrical shape, notably with a circular cross section, and the offset between the two end fittings may be determined as a function of the diameter of the body.

The ratio between the offset between the two end fittings and the diameter of the body may be between 0.2 and 1. The offset is between 2 mm and 6 mm, for example, notably between 3 mm and 5 mm, and the diameter of the body may be between 7.6 mm and 10 mm.

The connection between the free end of the wire loop and the end fitting may be effected by soldering and wire-wrapping.

In one embodiment of the invention, the body comprises two shells, one of which runs over the whole of the length of the body whereas the other runs over only a portion of the length of the body, the open portion of the body corresponding to the portion of the body in which only one shell runs. The aperture may then be formed by the absence of one of the shells in the open portion.

The wall of the aperture may run substantially parallel to the longitudinal axis of the body.

The device may include a tensioner around which the wire loop is wound. This tensioner makes it possible to ensure a satisfactory tension in the wire loop, this tension in the wire loop making it possible to ensure correct operation of the device because it maintains a satisfactory accuracy for the measurements delivered by the device.

The tensioner may be an elastic support made in one piece with the body or not, such a tensioner notably being generally U-shaped and working in compression.

Alternatively, the tensioner may be configured so as to be loaded in traction by the wire loop.

The tensioner may then be produced in accordance with the teaching of the application EP 2 350 779 already cited, the content of which is incorporated in the present application, at least in respect of the production of the tensioner. Such a tensioner can maintain a satisfactory tension in the wire loop despite high temperatures, for example of the order of 160° C., or problems of creep, in contrast to a tensioner working in compression and made of plastic material.

The wire is electrically resistive, for example, being produced in a metal having such a property. The wire may be a single-strand wire.

The device is configured to measure the oil level in an automobile vehicle, for example. The device may be configured to measure the level of other liquids in tanks of automobile vehicles or heavy goods vehicles.

A further object of the invention, according to another of its aspects, consists in a method of manufacturing a liquid level measuring device wherein:

- a body is obtained running along a longitudinal axis and having at least one open portion in which at least one aperture is provided in the wall of the body,
- a loop of electrical wire is placed at least in the open portion of the body so that it can be in contact with the liquid and run substantially parallel to the longitudinal axis of the body,
- there is placed in the body an electrical power supply circuit of the wire loop, the circuit including two end fittings situated in the open portion, these end fittings being disposed in an offset manner along the longitudinal axis of the body, and
- each end fitting is connected to an open end of the loop by means of a connection head introduced into the open portion of the body.

The above operations of the method may be effected in the order in which they are referred to or not.

The connection head is an automated head, for example, which can notably enable connection by soldering and/or wire-wrapping.

The invention may be better understood after reading the following description of one nonlimiting embodiment thereof and examining the appended drawing, in which:

FIG. 1 represents a prior art liquid level measuring device that has already been commented on, FIG. 2 is a partial diagrammatic representation of a liquid level measuring device in accordance with one embodiment of the invention, FIG. 3 is a view from above of the device from FIG. 2, FIG. 4 is a diagrammatic representation of one example of a tensioner that may be integrated into the device from FIGS. 2 and 3, and FIG. 5 is a view in section taken along the line V in FIG. 3.

A liquid level measuring device 1 in accordance with one embodiment of the invention is represented diagrammatically in FIGS. 2 and 3.

In the example described, the device 1 is configured to measure a crankcase oil level in an automobile vehicle, but the invention is not limited to any such application.

The device 1 includes a body 2 running along a longitudinal axis X. The body 2 is made of plastic material, for example, and may comprise two shells 3.

The body 2 has a cross section of circular shape, for example, and each shell may have a semicircular shape in cross section.

As can be seen in FIGS. 2 and 3, one of the shells may run along only a portion of the axis X and the absence of this shell 3 defines an open portion 5 of the body 2. In the example described, this open portion 5 of the body comprises, when observed perpendicularly to the axis X, a shell 3 and an aperture A formed by the absence of the other shell 3. The edges of this aperture 3 may then be defined by the end wall 8 of the shell 3.

In a similar way to what is represented in FIG. 1, other apertures 9 may be provided in the shell 3 at the level of the open portion 5, the other aperture or apertures 9 favoring the circulation of the liquid the level of which is to be measured in the open portion 5 or being configured to receive a pin for fixing the body to another part.

As represented in FIGS. 2 and 3, a wire loop 10 is disposed in the body 2. In the example considered here, this wire loop 10 runs solely in the open portion 5 of the body 2. In the example described, the wire loop is formed by a single-strand wire.

The electrical wire is made of metal, for example, notably from metal based on chrome-nickel.

The wire may be very thin, for example having a diameter between 60 μm and 100 μm, notably between 75 μm and 95 μm.

The loop 10 has two open ends 11 and a closed end 12 opposite the open ends 11 at the level of which it is wound around a tensioner 14 an example of which is represented in FIG. 4.

As can be seen in FIGS. 2 and 3, a power supply circuit may also form part of the device 1. This power supply circuit is connected to an electrical power supply that is not represented. The power supply may be integrated into the device or not and for example deliver a direct current repetitively for a finite duration. The power supply circuit includes means for routing the power supply to the wire loop 10. In the example of FIGS. 2 and 3 these routing means take the form of metal tracks 15 but the invention is not limited to any such example.

These routing means terminate in an end fitting 16 which may have a curved shape. The end fitting 16 can then project from the bottom 18 of the shell 3 in the open portion 5. The bottom 18 of the shell 3 corresponds in the example from FIGS. 2 and 3 to the portion of the shell 3 at equal distances from the walls 8 defining the aperture A of the open portion 5.

Each open end 11 of the wire loop 10 is connected to an end fitting 16. In the example described this connection employs soldering and wire-wrapping.

As can be seen in FIGS. 2 and 3, the end fittings 16 are disposed in an offset fashion along the axis X of the body, in other words on moving along this axis X one of the end fittings 16 is encountered and then the other end fitting, which follows the first end fitting 16 at a distance d. In the example under consideration this distance d is between 2 mm and 6 mm, notably between 3 mm and 5 mm, and the diameter of the body 2 is between 7.6 mm and 10 mm.

The connection of the wire loop 10 to each end fitting 16 and the tensioner 7 may be configured so that the wire loop 10 runs substantially parallel to the axis X.

As can be seen in FIG. 5, in the example described, the walls 8 limiting the shell 3 and the aperture A in the open portion 5 of the body 2 are such that the distance D, measured perpendicularly to the axis X, between the plane P tangential to the shell 3 at the level of the bottom 18 is less than the distance D', measured perpendicularly to this same axis X, between the plane P and the wire loop 10. In this way, a gap for access to the wire loop 10 in the vicinity of the open ends 11 is provided above the wall 18.

There will next be described an example of the manufacture of the device 1, an example of the structure of which has just been described. There is obtained, for example by molding, the body 2 with its shells 3 disposed so as to form the open portion 5. The tensioner 7 is compressed, for example by means of a blade.

The power supply circuit with the tracks 15 and the end fitting 16 is then produced, for example by molding it onto the bottom of the body 2.

The wire is introduced, one end 11 of which is connected to an end fitting 16 by wire-wrapping. The wire is then positioned around the tensioner 7 to form a loop 10 the other end of which is connected by wire-wrapping to the other end fitting 16. Each end 11 of the wire is then soldered to the corresponding end fitting 16.

Because of the offset d between the two end fittings 16, a head can be introduced for the above wire-wrapping and soldering operations. The passage of the head can be further facilitated by the lowering of the walls 8.

The invention is not limited to the examples that have just been described.

The expression "including a" must be understood as meaning "including at least one" unless the contrary is specified.

The invention claimed is:

1. A device for measuring a liquid level including:
   a body running along a longitudinal axis and having at least one open portion in which at least one aperture is provided in the wall of the body;
   a loop of electrical wire disposed at least in the open portion configured to be in contact with the liquid and to run parallel to the longitudinal axis of the body; and
   an electrical power supply circuit of the wire loop disposed in the body, the circuit including two end fittings disposed in the open portion, each end fitting being connected to one of the open ends of the loop,
   wherein the end fittings are disposed in an offset manner along the longitudinal axis of the body, and
   wherein the longitudinal axis is an axis that runs along a longest length of the body.

2. The device as claimed in claim 1, the aperture being such that at the level of each end fitting a distance measured perpendicularly to the longitudinal axis between the plane tangential to the bottom of the body and the edge of the aperture is less than a distance measured perpendicularly to said longitudinal axis between the plane tangential to the bottom of the body and the wire loop.

3. The device as claimed in claim 1, the power supply circuit including metal tracks and the end fitting forming an end of each track.

4. The device as claimed in claim 3, the end fitting having a curved shape.

5. The device as claimed in claim 1, wherein the body comprises a substantially cylindrical shape and the offset between the two end fittings being determined as a function of a diameter of the body.

6. The device as claimed in claim 5, the ratio between the offset between the two end fittings and the diameter of the body being between 0.2 and 1.

7. The device as claimed in claim 1, the connection between an open end of the loop and an end fitting being effected by soldering and wire-wrapping.

8. The device as claimed in claim 1, the body comprising two shells, one of which runs over a whole length of the body, and the other of the two shells runs over only a portion of the length of the body, the open portion of the body corresponding to the portion of the body in which only one shell runs.

9. The device as claimed in claim 1, further comprising a tensioner around which the wire loop is wound.

10. The device as claimed in claim 1, wherein the end fittings are molded into the body.

11. The device as claimed in claim 1, wherein the device is configured to measure an oil level in an automobile vehicle.

12. A method of manufacturing a liquid level measuring device comprising:
   obtaining a body running along a longitudinal axis and having at least one open portion in which at least one aperture is provided in the wall of the body;
   placing a loop of electrical wire at least in the open portion of the body so that the loop is in contact with the liquid and run parallel to the longitudinal axis of the body;
   placing, in the body an electrical power supply circuit of the wire loop, said circuit including two end fittings situated in the open portion of the body, the end fittings being disposed in an offset manner along the longitudinal axis of the body; and
   connecting each end fitting to an open end of the loop by means of a connection head introduced into the open portion of the body, and
   wherein the longitudinal axis is an axis that runs along a longest length of the body.

* * * * *